United States Patent [19]

Shinozaki et al.

[11] Patent Number: 4,820,237
[45] Date of Patent: Apr. 11, 1989

[54] COIN CONVEYING AND STACKING APPARATUS

[75] Inventors: Takashi Shinozaki; Hiroshi Tachikawa, both of Chiba, Japan

[73] Assignee: Laurel Bank Machines Co., Ltd., Tokyo, Japan

[21] Appl. No.: 16,007

[22] Filed: Feb. 18, 1987

[30] Foreign Application Priority Data

Feb. 28, 1986 [JP] Japan .............................. 61-28851[U]

[51] Int. Cl.⁴ ............................................... G07D 9/06
[52] U.S. Cl. ......................................... 453/61; 453/59; 53/254
[58] Field of Search ......................... 453/61, 62, 56, 31, 453/59, 58, 60; 53/212, 254, 532; 414/98, 31; 221/175; 271/207, 213, 214, 215, 217

[56] References Cited

U.S. PATENT DOCUMENTS

| 2,933,314 | 4/1960 | Stobb | 271/215 |
| 4,350,333 | 9/1982 | Landa | 271/217 |
| 4,515,172 | 5/1985 | Nakamura et al. | 453/56 X |
| 4,678,387 | 7/1987 | Sjogren et al. | 414/31 X |

FOREIGN PATENT DOCUMENTS

| 0104923 | 4/1984 | European Pat. Off. . | |
| 1574176 | 4/1967 | Fed. Rep. of Germany . | |
| 2646889 | 10/1976 | Fed. Rep. of Germany . | |
| 3043349 | 11/1980 | Fed. Rep. of Germany . | |
| 52-26295 | 2/1977 | Japan . | |
| 53-11293 | 1/1978 | Japan . | |
| 53-56094 | 5/1978 | Japan . | |
| 56-95774 | 7/1981 | Japan . | |
| 58-171318 | 10/1983 | Japan . | |
| 59-12688 | 4/1984 | Japan . | |
| 0118659 | 7/1984 | Japan | 271/213 |
| 59-121491 | 7/1984 | Japan . | |

Primary Examiner—Joseph J. Rolla
Assistant Examiner—Edward S. Ammeen
Attorney, Agent, or Firm—Fleit, Jacobson, Cohn & Price

[57] ABSTRACT

A coin stacking apparatus includes a conveyor for conveying coins edge-wise one at a time and delivering each of the conveyed coins in its horizontal position. A receiver receives the coins from the outlet end of the conveyor in a stacked condition. The receiver includes two endless belts running along the length of the receiver and cooperating with each other to form a coin receiving space therebetween. Each of the endless belts has a supporter extending therefrom. The supporter includes a surface on which the coins are to be placed. The surface is inclined upwardly and forwardly relative to the direction of the conveyor.

1 Claim, 4 Drawing Sheets

F I G. 2
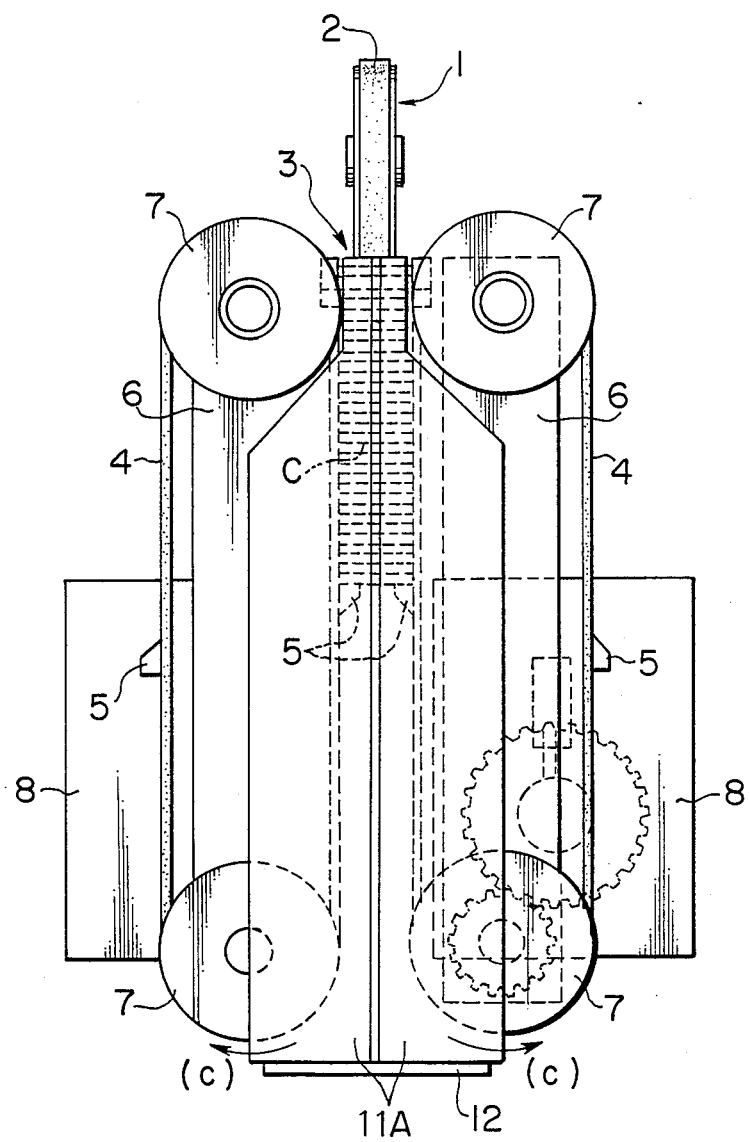

COIN CONVEYING AND STACKING APPARATUS

BACKGROUND OF THE INVENTION

The present invention relates a coin stacking apparatus which conveys coins edge-wise and stacks coins one by one.

When a number of coins are to be packaged, it is required to arrange the coins properly into their stacked state prior to the packaging.

One of the prior art coin stackers for such a purpose is shown in Japanese Laid-Open patent application No. 58-171318. As shown in FIGS. 4 and 5, the coin stacker is arranged such that coins C delivered horizontally from a conveying section 1 fall and are received in a receiver section 21 into their stacked state. The receiver section 21 includes a pair of endless belts 4 extending along the length thereof and arranged opposed to each other. Each of the endless belts 4 has support members 22 extending from the surface thereof and adapted to support the stacked coins C. First of all, a pair of associated support members 22 on the endless belts is positioned at the top of the receiver section 21. Coins C are then placed one by one on the pair of associated support members while at the same time the endless belts 4 are downwardly moved as shown by arrow (d) in FIG. 4 such that the associated support members 22 will gradually be moved downwardly by a distance corresponding to the thickness of one coin. On completion of stacking, the associated support members are moved outwardly around the turns of the endless belts at the lowermost position of the receiver section 21 as shown by arrow (e) in FIG. 5. As a result, the stacked coins C will be discharged downwardly from the receiver section. At the upper part of the receiver section 21 there are arranged a free roller 23 for re-positioning each of the coins C delivered horizontally from the conveyor section 1 into its forwardly and downwardly inclined position, a guide member (roller) 24 for picking up the leading end of the forwardly and downwardly inclined coin C and a control member 25 adapted to impact the leading end of the picked-up coin C such that coin C will fall into the receiver section. Thus, the coin C will fall into the receiver section with its leading end being positioned upwardly. In such a manner, jamming created when the trailing end of the coin C in question impacts the leading end of the next coin C can effectively be prevented.

However, such an arrangement of the prior art coin stacker requires a complicated process in which a coin C is inclined forwardly and downwardly by the free roller 23 and the leading end of that coin C is picked up before it impacts the control member 25 so that the coin C will have fallen into the receiver section. This tends to limit the speed of the process. At the same time, the apparatus tends to be complicated and increased in size.

SUMMARY OF THE INVENTION

It is, therefore, an object of the present invention to effectively prevent impact between coins subsequently delivered from the conveyor to the receiver sections, to prevent the jamming of the coins and at the same time to simplify the construction of the coin stacker.

In order to accomplish the above object, in the present invention each of the support members on the surfaces of the endless belts has a surface on which the coins are stacked, the surface being inclined upwardly and forwardly relative to the direction of coin conveyance in the conveyor section.

When the coins are stacked on the upwardly and forwardly inclined surfaces of the support members, each of the stacked coins will have its trailing end downwardly and rearwardly positioned relative to the direction of coin conveyance, so that the leading end of a subsequently delivered coin can be guided onto the top of the stacked coins while sliding on the upper face of the top coin in the stack.

BRIEF DESCRIPTION OF THE DRAWINGS

The above and other objects of the invention will be seen by reference to the following description in connection with the accompanying drawings, in which:

FIG. 2 is a view taken along a line II—II of FIG. 1 in the direction of the arrow.

DESCRIPTION OF THE PREFERRED EMBODIMENT

An embodiment of the coin stacker according to the present invention will now be described with reference to FIGS. 1 to 3.

Figure 1:
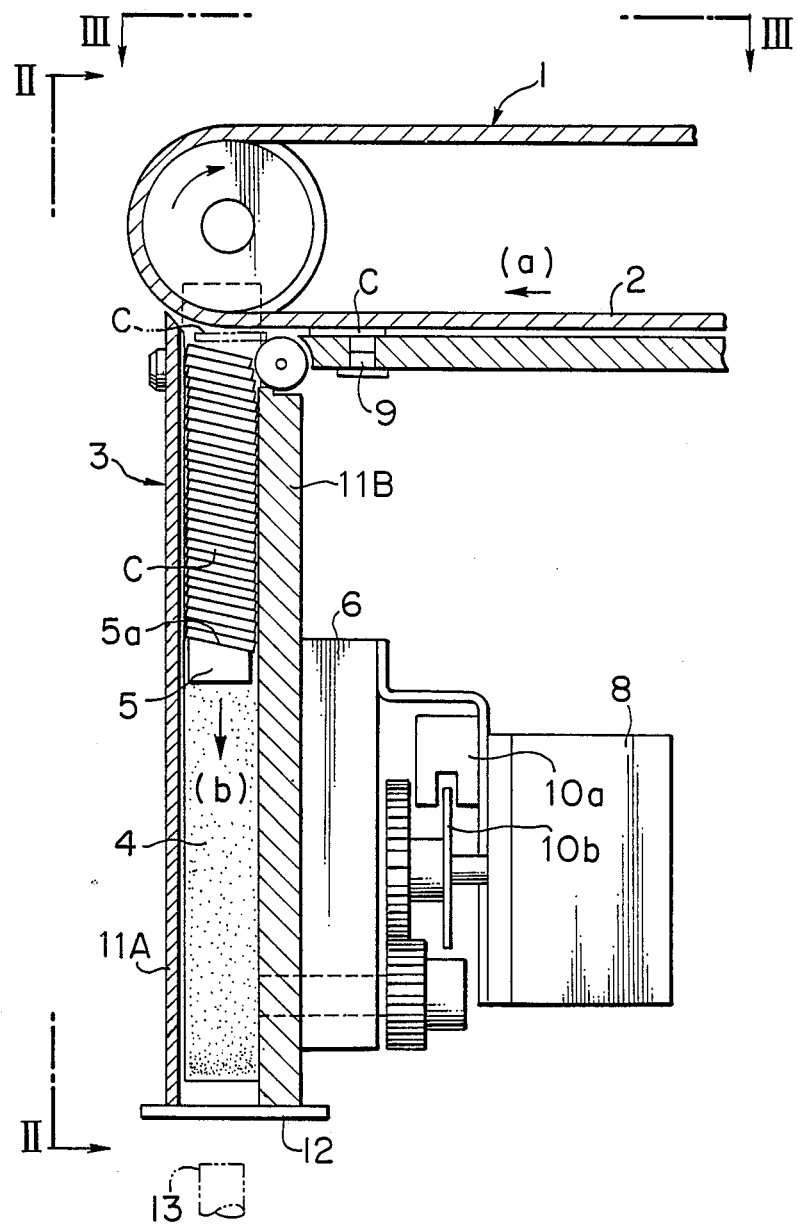
FIG. 1 is a front elevational view, partly in section, of one embodiment of a coin stacker according to the present invention.
Figure 4:
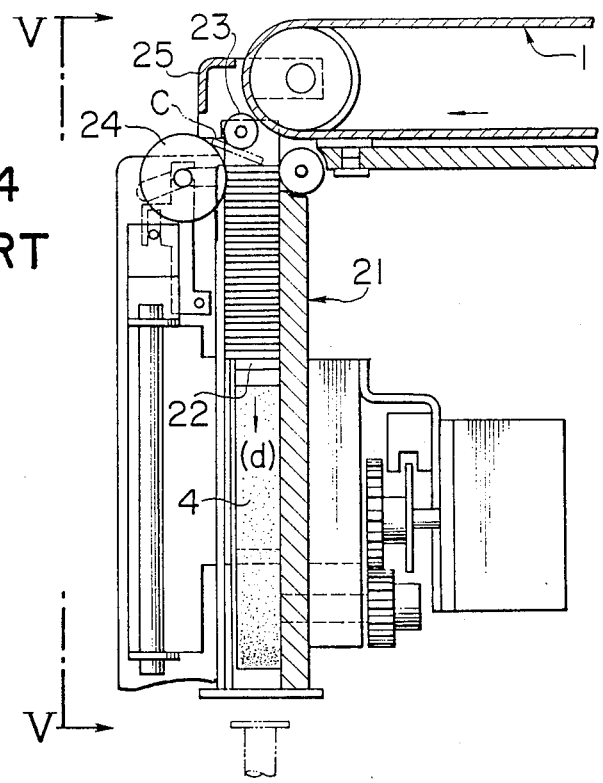
FIG. 4 is a front elevational view, partly in section, of one example of the prior art coin stackers.
Figure 5:
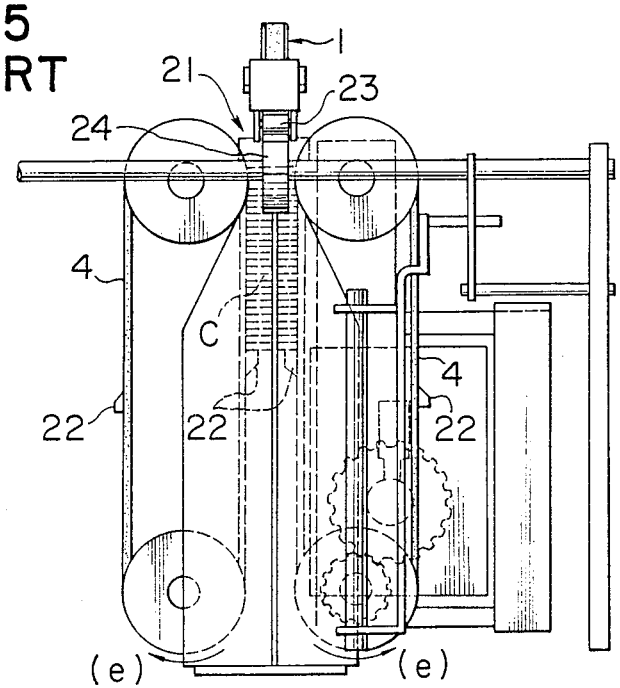
FIG. 5 is a view taken along a line V—V of FIG. 4 in the direction of the arrow.

As in the prior art, a coin stacker according to the present invention comprises a conveyor section 1 having a conveyor belt 2 which is adapted to convey coins C edge-wise one by one as shown by arrow (a) in FIG. 1. Each of the conveyed coins C is delivered horizontally from the forward end of the conveyor section 1 and falls in a receiver section 3 into a stacked state. The receiver section 3 includes a pair of endless belts 4 arranged opposed to each other and vertically extending along the opposite sides of a receiving space defined by the endless belts 4. Each of the endless belts has support members 5 extending into said receiving space and adapted to support the stack of the coins C as in the prior art shown in FIGS. 4 and 5. In such a case, each of the endless belts 4 is passed around pulleys 7 on the opposite ends of the corresponding support block 6 and arranged to run in the direction perpendicular to the direction of coin conveyance in the conveyor section 1. The lower pulley 7 is incrementally rotated by means of a pulse motor 8 such that the corresponding endless belt 4 will intermittently be moved along the length of the receiver section 3. When a sensor 9 on the conveyor section 1 detects the passage of each coin C, the pulse motor 8 is activated to drive the corresponding endless belt 4 so that the support member 5 will be moved downwardly by a distance corresponding to the thickness of one coin. Each of the pulse motors 8 includes a pair of sensors 10a and 10b for controlling the movement of the endless belt 4 at each time the passage of a coin C is sensed by the sensor 9.

In the illustrated embodiment, each of the endless belts 4 has two such support members 5 which are arranged to match the length of the stacked coins and are equidistantly spaced apart from each other along the length of the endless belt 4.

In accordance with the present invention, each of the support members 5 has a surface 5a on which coins C are to be placed and stacked, the surface 5a being inclined upwardly and forwardly relative to the direction of coin conveyance in the conveyor section 1.

Figure 3:
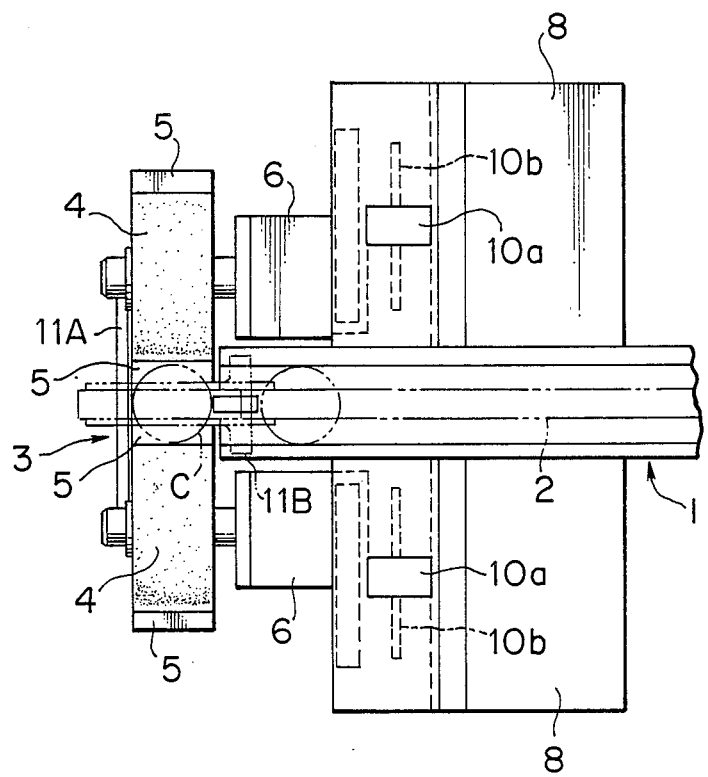
FIG. 3 is a view taken along a line III—III of FIG. 1 in the direction of the arrow.

In FIGS. 1 to 3, reference numerals 11A and 11B denote limiting members enclosing the sides of the receiving space between the endless belts 4 so that the delivered coins C can be prevented from falling out of the receiving space forwardly and rearwardly; reference numeral 12 designates a shutter adapted to open and close the lower end of the receiver section 3; and reference numeral 13 indicates a support rod for receiving the stack of coins C falling from the lower end of the receiver section 3 when the shutter 3 is opened.

In such an arrangement, a pair of the support members 5 on the respective endless belts 4 are first positioned at the uppermost position of the receiver section 3. As coins C are delivered into the receiver section 3 from the conveyor section 1 one by one in the aforementioned manner, the first delivered coin C is spanned between the paired support members 5 at their inclined surfaces 5a and the subsequent coins C are stacked on that bottom coin C. As the sensor 9 senses the passage of each of the coins C it generates a detection signal which is used to energize the pulse motors 8. Thus, the endless belts 4 are synchronously driven so as to incrementally move the support members 4 thereon downwardly by a distance corresponding to the thickness of one coin as shown in arrow (b) in FIG. 1. In such a manner, the coins C can be delivered and stacked in the receiver section 3.

Since the top surface 5a of each of the support members 5 is inclined upwardly and forwardly relative to the direction of coin conveyance in the conveyor section 1, each of the stacked coins C on the support members 5 will have its leading edge or end lowered from the horizontal plane as shown in FIG. 1. Therefore, a coin C horizontally delivered from the conveyor section 1 can be guided by the top face of the uppermost coin in the stack within the receiver section 3 while sliding thereon.

After a predetermined number of coins C are stacked in the receiver section 3, the endless belts 4 are further moved downwardly with their support members 5 being moved laterally out of the lower end of the receiver section 3 as shown in arrow (c) in FIG. 2. At the same time, the shutter 12 is opened to drop the stack of the coins C onto the support rod 13. As the first pair of support members 5 on the respective endless belts 4 is moved laterally out of the lower end of the receiver section 3, the second pair of support members 5 on the respective endless belts 4 is moved into the uppermost part of the receiving space between the endless belts 4 around the upper turns of the respective endless belts 4.

Thus, the coin stacker is ready for the next stacking process.

As will be apparent from the foregoing, the coin stacker according to the present invention has the following advantages:

(i) Since each of the support members has its coin supporting surface inclined upwardly and forwardly relative to the direction of coin conveyance in the conveyor section, the trailing edge or end of each of the coins spanned between and placed on the paired support members will be lowered from the horizontal plane. The leading edge or end of each of the subsequently delivered coins can be guided by the top face of the uppermost coin in the stack while sliding thereon. Therefore, any jamming can effectively be prevented when the coins are delivered from the conveyor section to the receiver section.

(ii) Each coin moved horizontally from the conveyor section can be transferred to the receiver section simply by placing it on the coin supporting surfaces of the support members. Therefore, the speed of coin handling can be increased. Furthermore, the construction of the coin stacker can be simplified and miniaturized by a simple modification that the surfaces of the support members supporting the stacked coins are inclined.

What we claim is:

1. A coin stacking apparatus comprising:
   conveyor means for conveyingt coins edgewise one at a time in a predetermined direction along a horizontal path of travel, and
   receiver means for receiving coins from a terminal portion of said horizontal path of travel at an outlet end of said conveyor means, said receiver means including a pair of endless belts cooperating with each other to define a coin receiving space therebetween,
   each of said endless belts having support means extending therefrom,
   said support means including a surface on which the coins are to be placed, said surface being inclined upwardly and forwardly relative to said predetermined direction along said horizontal path of travel of coin conveyance in said conveyor means so that a leading edge of said surface is higher than a trailing edge of said surface for guiding at an incline the initial contact of a leading edge of a first coin and each subsequently stacked coin received from said terminal portion of said horizontal path of travel onto said surface for said first coin and onto an upper face of a previously stacked coin lying at an incline on said surface for each of the subsequently stacked coins resulting in a trailing edge of each stacked coin being located below said terminal portion of said horizontal path of travel.

* * * * *